(12) United States Patent
Trommer et al.

(10) Patent No.: US 9,272,942 B2
(45) Date of Patent: Mar. 1, 2016

(54) METHOD FOR PRODUCING SYNTHETIC QUARTZ GLASS AND QUARTZ GLASS FOR USE AS CLADDING MATERIAL OF AN OPTICAL FIBER

(71) Applicant: Heraeus Quarzglas GmbH & Co. KG, Hanau (DE)

(72) Inventors: Martin Trommer, Bitterfeld (DE); Steffen Zwarg, Wolfen (DE); Ralph Sattman, Aschaffenburg (DE); Bodo Kuehn, Gelnhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/364,662

(22) PCT Filed: Dec. 12, 2012

(86) PCT No.: PCT/EP2012/075197
§ 371 (c)(1),
(2) Date: Jun. 11, 2014

(87) PCT Pub. No.: WO2013/087678
PCT Pub. Date: Jun. 20, 2013

(65) Prior Publication Data
US 2014/0349830 A1     Nov. 27, 2014

(30) Foreign Application Priority Data

Dec. 15, 2011  (DE) .......................... 10 2011 121 153

(51) Int. Cl.
*C03C 3/06*     (2006.01)
*C03B 37/014*   (2006.01)
*C03C 13/00*    (2006.01)

(52) U.S. Cl.
CPC ......... *C03B 37/014* (2013.01); *C03B 37/01406* (2013.01); *C03B 37/01413* (2013.01);
(Continued)

(58) Field of Classification Search
CPC ............ C03C 2201/02; C03C 2201/23; C03C 2201/26
USPC .......................................................... 501/54
See application file for complete search history.

(56) References Cited

U.S. PATENT DOCUMENTS 6,473,226 B1 * 10/2002 Jinbo et al. .................... 359/355
6,611,650 B2 *  8/2003 Hayami et al. ................ 385/142
(Continued)

FOREIGN PATENT DOCUMENTS

EP        0878451 A1    11/1998
EP        1179514 A1     2/2002
(Continued)

*Primary Examiner* — Noah Wiese
(74) *Attorney, Agent, or Firm* — Tiajoloff and Kelly LLP

(57) ABSTRACT

A known method for producing synthetic quartz glass comprises: (a) reacting a carbonic silicon compound-containing raw material with oxygen in a reaction zone into SiO2 particles, (b) precipitating the SiO2 particles on a sedimentation area by forming a porous SiO2 soot body containing hydrogen and hydroxyl groups, (c) drying the porous SiO2 soot body, and (d) glazing to the synthetic quartz glass by heating the soot body up to a glazing temperature. In order to facilitate cost-efficient production of quartz glass by means of pyrolyzing or hydrolyzing a carbon-containing silicon compound using a carbon-containing raw material, the invention describes the production of a soot body with a carbon content within the range of 1 ppm by weight to 50 ppm by weight.

9 Claims, 2 Drawing Sheets

Figure 1:
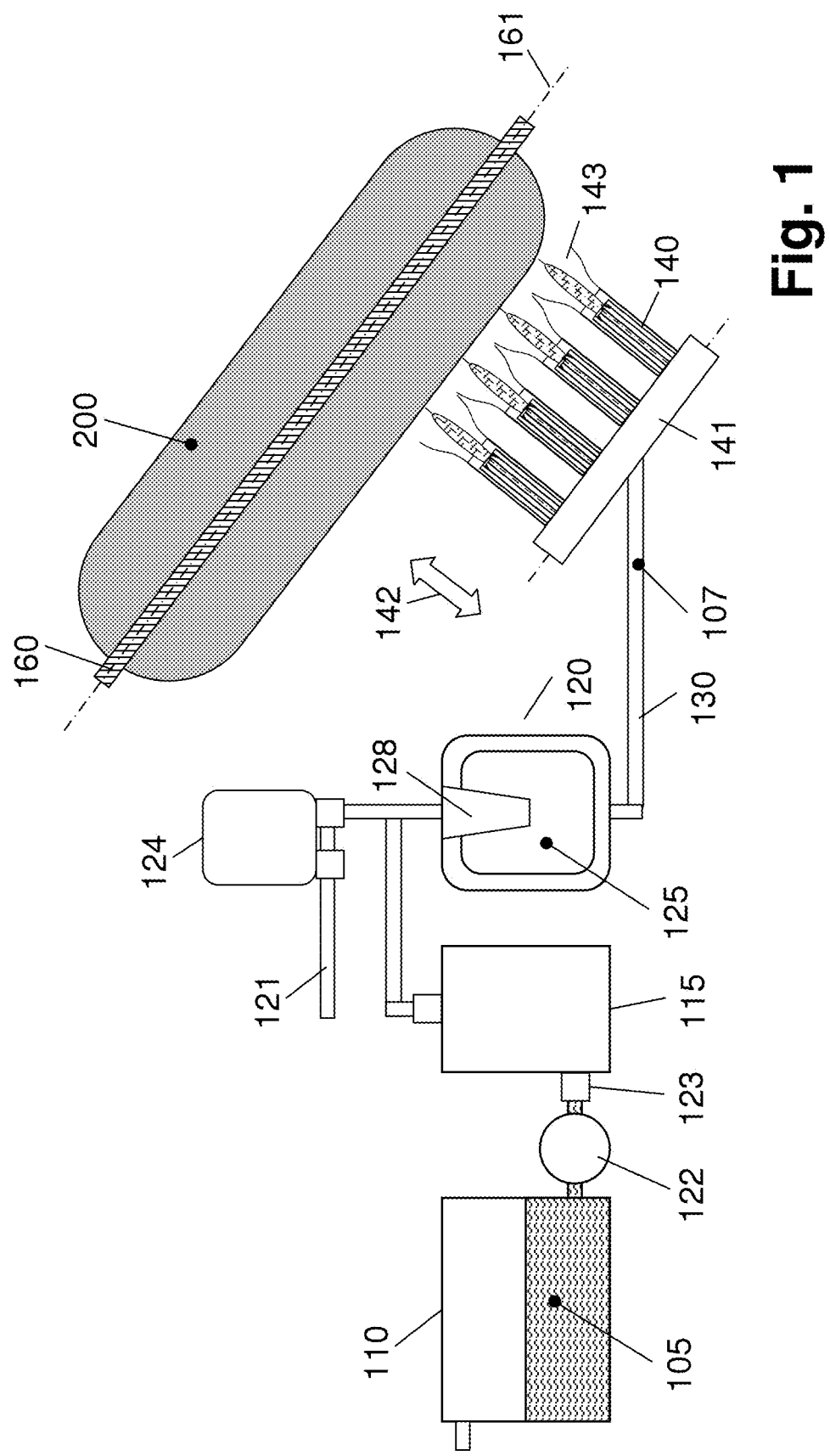

(52) U.S. Cl.
CPC ........... *C03C13/008* (2013.01); *C03B 2201/20* (2013.01); *C03B 2201/84* (2013.01); *C03B 2207/32* (2013.01); *C03B 2207/36* (2013.01); *C03C 2213/00* (2013.01)

(56) References Cited

U.S. PATENT DOCUMENTS 7,841,211 B2 * 11/2010 Sato et al. ............... 65/32.1

| 2002/0039477 | A1 | 4/2002 | Hayami et al. |
| 2002/0144517 | A1 | 10/2002 | Fujiwara et al. |
| 2002/0157420 | A1 | 10/2002 | Hrdina et al. |
| 2006/0059948 | A1 | 3/2006 | Sato et al. |
| 2008/0119346 | A1 * | 5/2008 | Otsuka et al. ............... 501/53 |

FOREIGN PATENT DOCUMENTS

EP    1580170 A1    9/2005
WO    9010596 A1    9/1990

* cited by examiner

METHOD FOR PRODUCING SYNTHETIC QUARTZ GLASS AND QUARTZ GLASS FOR USE AS CLADDING MATERIAL OF AN OPTICAL FIBER

The present invention relates to a method for producing synthetic quartz glass, the method comprising the steps of:
(a) reacting a feedstock containing carbon-containing silicon compound with oxygen in a reaction zone so as to obtain $SiO_2$ particles,
(b) depositing the $SiO_2$ particles on a deposition surface to form a porous $SiO_2$ soot body containing carbon and hydroxyl groups,
(c) drying the porous $SiO_2$ soot body, and
(d) vitrifying the soot body by heating to a vitrification temperature so as to form the synthetic quartz glass.

Furthermore, the present invention relates to a synthetic quartz glass for use as cladding material of an optical fiber.

To produce synthetic quartz glass, $SiO_2$ particles are produced from a silicon-containing feedstock in a CVD method by hydrolysis or oxidation, and these particles are deposited on a carrier. Examples thereof are the so-called OVD method (outside vapor phase deposition), the VAD method (vapor phase axial deposition) or the POD method (plasma outside deposition).

At a sufficiently high temperature in the region of the carrier surface the $SiO_2$ particles are directly vitrified, which is also known as "direct vitrification". By contrast, in the so-called "soot method" the temperature during deposition of the $SiO_2$ particles is so low that a porous $SiO_2$ soot layer is obtained that is sintered in a separate process step to obtain transparent quartz glass. Both direct vitrification and soot method yield a dense and transparent synthetic quartz glass of high purity.

In the past, silicon tetrachloride ($SiCl_4$) turned out to be useful as a silicon-containing feedstock. In the reaction of $SiCl_4$ and other chlorine-containing feedstock, hydrochloric acid is formed; this entails high costs in terms of flue gas scrubbing and disposal. That is why chlorine-free organosilicon compounds are more and more used as feedstock for quartz glass production. Monosilanes, alkoxysilanes, siloxanes and silazanes should be mentioned as examples. A particularly interesting group of chlorine-free organosilicon compounds are the polyalkylsiloxanes (shortly also called "siloxanes"). Polyalkylcyclosiloxanes are distinguished by a particularly high amount of silicon per weight proportion, which makes their use profitable in the production of synthetic quartz glass. Octamethylcyclotetrasiloxane (OMCTS) is particularly used as it is available on a large scale and in a high purity.

PRIOR ART

WO 90/10596 A1 discloses a method of the aforementioned type for producing synthetic quartz glass using chlorine-free polyalkylcyclosiloxanes as a feedstock. For the production of a $SiO_2$ soot body, OMCTS vapor is fed to the central nozzle orifice of a multinozzle deposition burner at a rate of 0.086 m³/h together with nitrogen as the carrier gas at a rate of 0.03 m³/h. The first ring nozzle is fed with hydrogen and the second ring nozzle with oxygen. Silica particles are formed therefrom in the burner flame and deposited layer by layer on the outer cylinder surface of a cylindrical graphite mandrel rotating about its longitudinal axis, with a diameter of 100 mm. The temperature in the deposition zone is here kept within the range of 1000-1300° C., so that after a deposition period of 8 hours a porous $SiO_2$ soot body is obtained with a weight of about 5 kg and a mean density of 0.4 g/cm³. The soot body is dried under vacuum and simultaneously sintered into a transparent tube of high-purity, chloride-free, synthetic quartz glass with a hydroxyl group content (OH content) of less than 1 ppm. The quartz glass tube is suited as a cladding material for an optical fiber.

Technical Objective

The production of synthetic quartz glass by means of the soot method requires many process steps, the number and duration of which constitutes an essential cost factor.

In the hydrolysis or oxidation of organic, i.e. carbon-containing, feedstock for producing $SiO_2$ it is basically possible that carbon is formed in the soot body. WO 90/10596 A1 reports in this connection that carbon is undesired and may evolve in the case of an incomplete combustion of the feedstock. To avoid this, it is suggested that a feedstock should be used with an atomic carbon content that is as small as possible and that the deposition process should be carried out in the presence of excess oxygen. Excess oxygen during the deposition process results however in a lower deposition rate as compared with stoichiometric oxygen.

A particularly time- and cost-intensive process step is the dehydration treatment of the soot body for eliminating hydroxyl groups (OH groups). These are introduced into the soot body matrix due to the manufacturing process and have an influence on the transmission characteristics, particularly in the infrared wavelength range which is of importance to the optical transmission in glass fibers. To minimize the hydroxyl group content, dehydration treatments at a high temperature under the action of vacuum or in a reactive treatment atmosphere are generally known.

A reactive treatment generally requires shorter treatment durations and may lead to lower residual contents of hydroxyl groups than the thermally supported vacuum treatment. Suitable reactive components are halogens, particularly chlorine. The soot body is here exposed to a chlorine-containing atmosphere at a high temperature around 800° C., resulting in the substitution of OH groups by chlorine and in the incorporation of chlorine into the glass network. By comparison, a purely physical—and not a chemically supported—reduction of the hydroxyl group content to values below 50 wt. ppm requires long treatment periods at high temperatures.

The use of chlorine, however, partly offsets the above-mentioned advantage of chlorine-free start substances with respect to the formation of hydrochloric acid and the lower costs for flue gas scrubbing and disposal. Therefore, there is the fundamental need to avoid reactive treatments of the soot body in a chlorine-containing atmosphere or to minimize the use of chlorine.

It is the object of the present invention to indicate a method which permits an inexpensive production of quartz glass by pyrolysis or hydrolysis of a carbon-containing silicon compound using a carbon-containing feedstock.

Furthermore, it is the object of the present invention to provide a synthetic quartz glass for use as an inexpensive cladding material for optical fibers for telecommunications technology.

General Description of the Invention

As for the method, this object starting from a method of the aforementioned type is achieved according to the invention in that a soot body is produced with a carbon content in the range of 1 wt. ppm to 50 wt. ppm.

The method according to the invention requires as an intermediate stage a porous SiO₂ soot body which is doped with carbon in a narrow concentration range (hereinafter also called "carbon doping"). A carbon content in the synthetic quartz glass or in the soot body is normally regarded as a flaw or deficiency that should be avoided. Surprisingly, however, it has been found that carbon doping in the soot body to the extent of 1 to 50 wt. ppm entails efficiency advantages in the deposition process and also in the drying process:

(1) Due to the heating up during the drying process the carbon which is present in traces reacts with the H₂O molecules contained in the soot body and with the OH groups to form CO and H₂. The reaction can be described by the following chemical equation:

$$H_2O + C \rightarrow CO + H_2 \qquad (1)$$

$$2OH + C \rightarrow CO_2 + H_2 \qquad (2)$$

$$OH + CO \rightarrow CO_2 + \tfrac{1}{2}H_2 \qquad (3)$$

Carbon is present in atomic form or in the form of hydrocarbon compounds, especially methyl groups or other fragments of the feedstock. It is finely dispersed in the soot body matrix and acts as a reactive drying agent on account of the above reactions. It helps to dry the soot body at least insofar as the drying process is intensified and accelerated. For applications of the quartz glass where high demands are made on the absence of hydroxyl groups, e.g. for use as a fiber material in telecommunications engineering, the amount of other reactive drying reagents, such as chlorine, can be reduced, or the drying period can be shortened. For applications where less demands are made on the absence of hydroxyl groups, e.g. for lenses in microlithography, other reactive drying reagents can also be dispensed with entirely.

(2) The carbon doping to be set in the soot body can be achieved by way of an incomplete combustion of the silicon compound in the deposition process. This, in turn, makes it possible to run the deposition process with a fuel-rich flame. This is a flame in which the amount of oxygen is so low and the amount of silicon compound to be burnt is so great that a complete combustion is ruled out under the given reaction conditions. A fuel-rich flame allows particularly high deposition rates, resulting in a cost advantage in comparison with the standard deposition process with a neutral or "lean, oxygen-rich flame".

Hence, the modification of the standard deposition according to the invention is via an intermediate stage in the form of a soot body with low demands being made on purity and is accompanied by efficiency gains both in the deposition process and in the subsequent drying process. The extent of these effects depends on the carbon concentration in the soot body. Carbon doping of less than 1 wt. ppm has little effect. At concentrations of more than 50 wt. ppm gaseous reaction products may form in the further processing process and the reducing effect of the carbon can be noticed insofar as more and more oxygen deficient centers are produced that may have an adverse effect on the quality of the quartz glass. Although this effect can be reduced or eliminated by way of an oxidizing atmosphere during vitrification, this may be accompanied by technological oxidation problems. On the other hand, oxygen deficient centers can be tolerated in the quartz glass, depending on its intended use. For instance, for quartz glass to be used as a fiber material in telecommunications technology, the demands made on the absence of defects are comparatively low; for quartz glass to be used in microlithography they are comparatively high. In this respect the carbon content in the soot body is preferably in the range of 2 wt. ppm to 25 wt. ppm.

Measures for setting the desired carbon doping by way of a fuel-rich flame can be checked as to their suitability in a few tests. In the simplest case, the carbon content is produced in that during the reaction of the feedstock according to method step (a) an over-stoichiometric fraction of the carbon-containing silicon compound is provided in the reaction zone.

In contrast to the advice given in the aforementioned WO 90/10596 A1, the reaction zone is here not fed with oxygen, but the silicon compound to be burnt is supplied in excess thereto. "In excess" or "with over-stoichiometric fraction" means here that the amount of oxidizing components in the reaction zone is not enough for completely burning the feedstock. In comparison with a neutral or "lean" oxygen-rich flame, this yields a higher deposition rate, which simultaneously rules out complete combustion of the silicon compound in the reaction zone for stoichiometric reasons alone.

As an alternative or supplement thereto, it has also turned out to be advantageous with respect to an enhanced deposition rate when the carbon content is produced in that the residence time of the carbon-containing silicon compound in the reaction zone is set to be shorter than needed for the complete reaction of the feedstock.

A complete combustion in the reaction zone can e.g. be prevented when the feedstock in the reaction zone is shielded from oxygen, e.g. by providing a separation gas stream consisting of inert gas between the stream consisting of feedstock and an oxygen stream. Preferably, however, it is intended that the residence time is provided by setting an excessively short reaction zone and/or by producing an excessively high flow velocity of the feedstock in the reaction zone.

The residence time of the feedstock in the reaction zone is achieved by way of an accelerated throughput and/or by way of an absolute shortening of the reaction zone. Both measures are suited to set the residence time of the feedstock in the reaction zone such that it is shorter than the residence time needed for complete reaction. An "excessively short reaction zone" in this sense can e.g. be achieved in that during the deposition process a distance between a deposition burner and the deposition surface is set such that it is shorter than needed for the complete reaction.

It has turned out to be useful when a soot body is produced having a mean relative density, based on the density of quartz glass (2.21 g/cm³), in the range between 20% and 35%.

Soot bodies with a mean relative density of less than 20% are mechanically instable and tend to deform and to form bubbles during vitrification. Soot bodies with a mean relative density of more than 35% hamper a fast and efficient drying process.

Drying according to method step c) is preferably carried out by heating the porous soot body in a halogen-containing atmosphere such that a hydroxyl group content of less than 1 wt. ppm is set in the synthetic quartz glass.

As has already been explained further above, carbon doping brings about a drying of the soot body because of its reducing effect or at least contributes to a faster and more efficient drying. When very high demands are made on the absence of hydroxyl groups, as for example when the quartz glass is used as fiber material in telecommunications engineering, the drying effect of slight carbon dopings of up to 50 wt. ppm may however turn out to be insufficient. In these cases the use of a halogen-containing drying reagent is suggested in addition, particularly the use of chlorine. Although the soot body may thereby be loaded with the corresponding halogen, this can be accepted for the use of the quartz glass as fiber material in telecommunications technology. On account of the supplementary drying effect produced by carbon doping, one achieves at any rate a faster drying (at the same hydroxyl group content) or a lower hydroxyl group content (at the same drying period) and consumption of halogen and its input into the soot body is lower than without carbon doping.

Due to the supplementary reactive drying, the soot body is loaded with the corresponding halogen, which without any special precautionary measures remains for the greatest part in the quartz glass also after the vitrification process. In the case of chlorine it has turned out to be useful when the drying process is conducted such that a chlorine content in the range of 800-2500 wt. ppm is set in the synthetic quartz glass after vitrification.

Preferably, OMCTS is used as feedstock.

OMCTS is a carbon-containing organic silicon compound that is available on an industrial scale in high purity and is distinguished by a high fraction of silicon per molecule.

As for the synthetic quartz glass for use as a cladding material of an optical fiber, the above-indicated object is achieved according to the invention by way of a quartz glass having: a content of oxygen defect centers, expressed by an extinction coefficient k248 at a wavelength of 248 nm with: $0.0035 < k248 < 0.1\ cm^{-1}$, a chlorine content in the range of 800-2500 wt. ppm and a hydroxyl group content of less than 0.5 wt. ppm Such a synthetic quartz glass is available at low costs by means of the method according to the invention via an intermediate product in the form of a soot body with a carbon content in the range of 1-50 wt. ppm, on condition that when the soot body is dried, the drying effect is supplemented by carbon doping by using a chlorine-containing drying gas.

When the temperature is raised, the carbon doping of the soot body develops a reducing effect which manifests itself in the formation of oxygen defect centers (hereinafter also called "ODC centers" (Oxygen Deficient Center"). In quartz glass, ODC centers have an absorption maximum at a wavelength of about 248 nm. The absorption at this wavelength is therefore suited as a measure of the amount of ODC centers in the quartz glass. The synthetic quartz glass according to the invention has a significant extinction coefficient k248 at this wavelength in the range of 0.0035 to 0.1 $cm^{-1}$. This drawback does not outweigh the cost advantages that are due to the efficient deposition and the quite efficient drying process; for applications as a cladding material for optical fibers a content of ODC centers in this range does not pose any problems.

Furthermore, the quartz glass according to the invention is distinguished by an extremely low hydroxyl group content of less than 0.5 wt. ppm, preferably less than 0.2 wt. ppm. This is accompanied by a certain content of chlorine [Cl] in the range of 800-2500 wt. ppm.

The quartz glass according to the invention is obtained by way of an efficient drying process which is defined on the one hand by carbon doping and on the other hand by the intensity of the chlorine treatment. Both measures have certain drawbacks, namely the ODC formation on the one hand (which by the way is solely generated by the dehydration treatment of the soot body in a chlorine-containing atmosphere) and chlorine loading on the other hand. These drawbacks are however compensated by the cost savings achieved in the drying process. An optimum is substantially independent of the degree of drying and is distinguished by a ratio [Cl]/k248, where: $100,000 < [Cl]/k248 < 550,000$.

At ratios below 100,000 the number of the ODC centers is disproportionately high, and at ratios above 550,000 the chlorine content is disproportionately high.

EMBODIMENT

Figure 2:
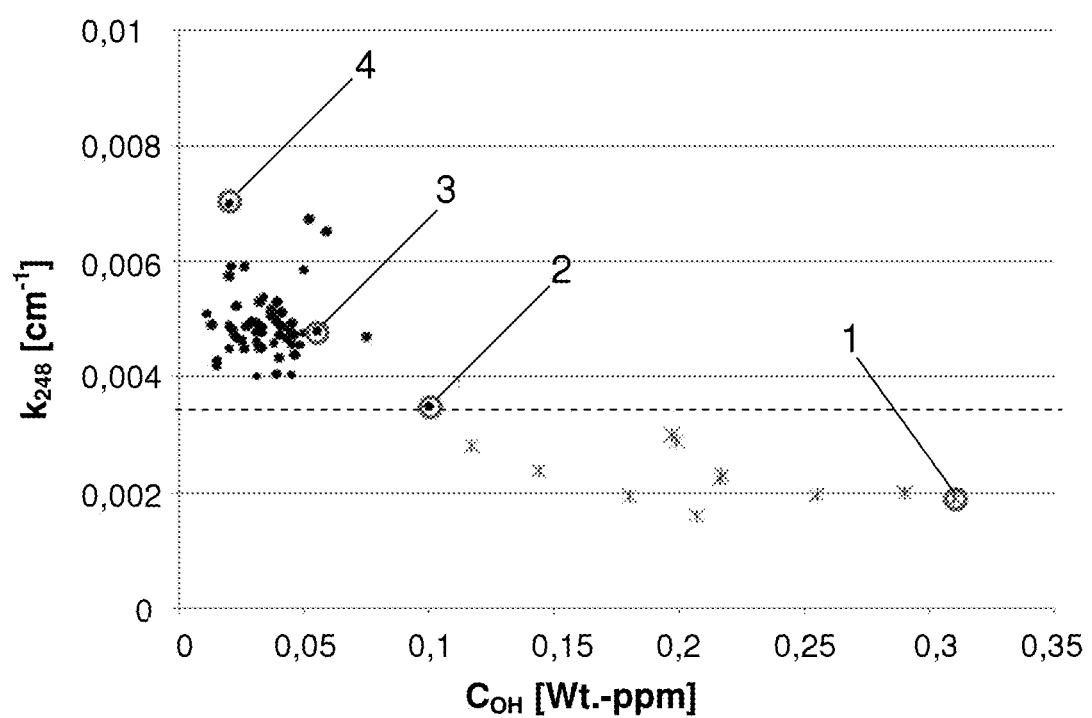

The invention will now be explained in more detail with reference to embodiments and a drawing, in which FIG. 1 shows an apparatus for performing the method according to the invention for producing a $SiO_2$ soot body in a schematic illustration; and FIG. 2 shows a diagram with respect to the dependence of k248 on the drying degree in different manufacturing methods.

STANDARD PRODUCTION OF A $SiO_2$ SOOT BODY

A $SiO_2$ soot body 200 is produced with the apparatus schematically shown in FIG. 1. Multiple flame hydrolysis burners 140 which are arranged in a row are disposed along a carrier tube 160 of aluminum oxide and are reversingly reciprocated for soot deposition in a joint burner row along the rotating carrier tube 160, wherein each of the burner flames 143 only sweeps over a sub-length of the carrier tube 160. The flame hydrolysis burners 140 are mounted on a joint burner block 141 which is reciprocated in parallel with the longitudinal axis 161 of the carrier tube 160 between two reversal points that are stationary relative to the longitudinal axis 161, and which is displaceable in a direction perpendicular thereto, as outlined by the directional arrows 142. The burners 140 consist of quartz glass; their center-to-center distance to each other is 15 cm.

Oxygen and hydrogen are respectively supplied to the flame hydrolysis burners 140 and are burned in the respectively assigned burner flames 143 together with a feedstock for the formation of $SiO_2$ particles. The $SiO_2$ feed vapor 107 is produced from liquid OMCTS 105 having a purity of more than 99 wt. ppm. For this purpose the liquid OMCTS 105 is evaporated and supplied to the reaction zone in gaseous form and decomposed therein by oxidation and/or hydrolysis and/or pyrolysis to obtain $SiO_2$ particles.

The $SiO_2$ particles are deposited on the outer cylinder surface of the carrier tube 160 which is rotating about its longitudinal axis 161, so that the soot body 200 is built up layer by layer with an outer diameter of 350 mm. During the deposition process a temperature of about 1200° is achieved on the soot body surface.

The feed vapor 107 is produced by evaporating the OMCTS feedstock 105 by means of an evaporator 120 which has arranged upstream thereof: a reservoir 110 for the liquid OMCTS, a liquid pump 122, a flow meter 123 for liquid, a preheater 115, an MFC (mass flow controller) 124 for the controlled supply of a nitrogen carrier gas stream which is supplied via line 121. Furthermore, a heatable evaporation chamber 125 with a liquid atomizer 128 is provided.

The reservoir 110 is kept at room temperature, and the liquid is supplied by means of the pump 122 via the flow meter 123 and the preheater 115 in an exact dosage to the liquid atomizer 128. Upstream of the atomizer 128, a nitrogen carrier gas stream which is preheated to 190° C. is supplied to the OMCTS stream, controlled via the MFC 124.

The liquid atomizer 128, which is also called atomizer nozzle, is a supersonic atomizer. It is simultaneously fed with a nitrogen carrier gas stream via the MFC 124 and with the liquid to be evaporated, at a pressure of about 5 bar. The liquid is atomized in fine droplets with a maximum diameter of 1 μm and directly sprayed into the evaporation chamber 125.

The evaporation chamber 125 has an internal temperature of 160° C., so that the fine liquid droplets directly and immediately evaporate in the gas phase and the vapor stream is supplied to a stationary distributor station and is distributed by said station via thermally insulated flexible media supply lines over the individual deposition burners 140. Oxygen and hydrogen are supplied to the deposition burners 140 via separate supply lines.

Combustible gases and the $SiO_2$ feed vapor 107 are only mixed in the hot zone of the burner flame 143. The stoichiometry between combustible gases (hydrogen and possible hydrocarbons) and $SiO_2$ feed vapor 107 on the one hand and oxygen on the other hand as well as the respective flow velocities and the accompanying residence times in the burner flame 143 are matched such that the OMCTS used is completely converted into $SiO_2$ particles.

After completion of the deposition process one obtains a tube of porous $SiO_2$ soot (soot tube) with an external diameter of 350 mm, a length of 2500 mm and a mean relative soot density of 25% (based on the density of quartz glass=2.21 g/cm$^3$).

Drying and Vitrifying of the Soot Body

The soot tube is subjected to a dehydration treatment so as to remove the hydroxyl groups introduced due to the manufacturing process. It is introduced in vertical orientation into a dehydration furnace and dehydrated after a preheating process of 900° C. at this temperature in a chlorine-containing atmosphere. The treatment duration is 24 hours.

The dried soot body is subsequently vitrified in a sinter furnace at a temperature of about 1550° C. under vacuum ($10^{-2}$ mbar) to obtain a transparent quartz glass blank.

The mean hydroxyl group content of the quartz glass obtained thereby is 0.2 wt. ppm, the mean chlorine content is about 1600 wt. ppm, and the carbon content is less than 1 wt. ppm. The quartz glass of the soot body has a relatively small number of oxygen deficiencies, which are mainly due to the drying process and which effect an absorption at a wavelength of 248 nm, which manifests itself as k248 value=0.0022 cm$^{-1}$.

Summary of the Parameters of the Standard Process

| Stoichiometric ratio [combustible gases + OMCTS]/oxygen V: | 1 |
|---|---|
| $SiO_2$ build-up rate ($R_{SiO2}$) in rel. unit: | 100% |
| Build-up duration $t_{build-up}$ in rel. unit: | 100% |
| Drying temperature $T_{drying}$ in ° C.: | 900 |
| Drying duration $t_{drying}$ in h: | 24 |
| C-content [C] in wt. ppm: | <1 |
| Chlorine content [$Cl_2$] in wt. ppm: | 1,600 |
| Hydroxyl group content [OH] in wt. ppm: | <0.2 |
| Extinction coefficient $k_{248}$ in cm$^{-1}$: | 0.0019 |

Table 1 summarizes the corresponding parameters and further embodiments of the invention and the results thereof.

In tests 2 to 4, the deposition process was carried out for producing the soot body with a slightly over-stoichiometric content of OMCTS, i.e. with a rather fuel-rich flame. This resulted in an incomplete combustion of the OMCTS, but also in a higher build-up rate (indicated as a relative value with respect to the build-up rate in the standard process=100%) and together with this in a shorter build-up time. During deposition of the soot body of test 4 the distance between the deposition burners 140 and the surface of the soot body 20 was additionally shortened in comparison with the distance in the standard process, resulting in a shorter residence time of OMCTS in the respective burner flame 143.

The soot bodies produced on the basis of tests 2 to 4 contained the amounts of carbon indicated in Table 1. The carbon has a reducing effect and contributes to the dehydration of the soot body in the subsequent drying process in chlorine-containing atmosphere. This leads to a shorter drying time and less chlorine loading in comparison with the standard process; a hydroxyl group content which corresponds to the standard drying process or is even lower is set in the quartz glass.

However, in this procedure the reducing effect of the carbon also leads to a certain amount of oxygen defect centers, which manifests itself in an absorption increased in comparison with the standard at a wavelength of 248 nm.

The described effects of the carbon doping process are particularly clearly manifested in the soot body of test no. 4; for its production a fuel-rich flame was used and the residence time in the flame was shortened in comparison with the standard. A particularly high $SiO_2$ build-up rate was also achieved due to the increased supply rate of the feedstock. The carbon doping of about 20 wt. ppm produced in this way makes it possible to shorten the drying duration in the drying process at the same chlorine content of the atmosphere and thus permits a considerably reduced chlorine loading of the soot body.

In comparison with the standard process the inventive modification of the soot body production leads to a faster deposition process, a shorter treatment period and less gas consumption during drying of the soot body. Especially because of the process duration which is shorter in comparison with the standard process, the quartz glass can be produced at very low costs. The tests carried out with carbon doping up to 20 wt. ppm demonstrate that these positive effects scale with the carbon doping. It must be assumed that this effect also occurs in the case of even higher carbon doping of up to at least 50 wt. ppm and even more.

The quartz glass obtained from the soot body of test 4 after vitrification shows an absorption of 0.007 cm$^{-1}$ at a wavelength of 248 nm, a chlorine content of about 1260 wt. ppm and a very low hydroxyl group content of 0.02 wt. ppm. The ratio of chlorine content and k248 value is thus 180,000.

TABLE 1

| No. | V | Build-up rate [%] | Drying duration [h] | C content [ppm] | Chlorine content [ppm] | OH content [ppm] | $k_{248}$ value [cm$^{-1}$] | Characteristic |
|---|---|---|---|---|---|---|---|---|
| 1 | 1 | 100 | 24 | <1 | 1600 | 0.31 | 0.0019 | Standard parameter |
| 2 | 1.02 | 104 | 23 | 3 | 1425 | 0.1 | 0.0035 | Burner flame: $O_2$ substoichiometric |
| 3 | 1.05 | 107 | 21.5 | 7 | 1340 | 0.06 | 0.0048 | Burner flame: $O_2$ substoichiometric |
| 4 | 1.05 | 112 | 20 | 20 | 1260 | 0.02 | 0.007 | Burner flame: $O_2$ substoichiometric + shortened distance |

Despite its absorption at 248 nm, which is due to oxygen deficient sites in the quartz glass, it is suited as a cladding glass for an optical fiber.

In the diagram of FIG. 2 the $k_{248}$ values are plotted in $cm^{-1}$ on the y-axis and the hydroxyl group content $C_{OH}$ in wt. ppm on the x-axis.

The measurement samples produced according to the method of the invention are shown as circles; the measurement samples produced according to the standard method are shown as stars. The samples listed in Table 1 are designated with reference numerals 1, 2, 3 and 4. The plotting of all measurement values reveals a noticeable accumulation of quartz glass produced according to the invention and in the traditional way at both sides of a specific k248 value of 0.0035. The samples below this boundary line were all produced in the standard method. In these samples the k248 value varies between 0.002 and 0.0035, and there is a certain dependence on the hydroxyl group content of the resulting quartz glass.

By comparison, the samples produced according to the method of the invention that are plotted above the boundary line of 0.0035 show no significant dependence on the hydroxyl group content.

The invention claimed is:

1. A method for producing synthetic quartz glass, said method comprising:
   (a) reacting a feedstock containing a carbon-containing silicon compound with oxygen in a reaction zone so as to obtain $SiO_2$ particles,
   (b) depositing the $SiO_2$ particles on a deposition surface so as to form a porous $SiO_2$ soot body containing and hydroxyl groups,
   (c) drying the porous $SiO_2$ soot body, and
   (d) vitrifying the soot body by heating to a vitrification temperature so as to form the synthetic quartz glass, wherein the soot body has a carbon content in the range of 1 wt. ppm to 50 wt. ppm; and
   wherein the drying is carried out by heating the porous soot body in a halogen-containing atmosphere.

2. The method according to claim 1, wherein the carbon content is produced by providing an over-stoichiometric fraction of the carbon-containing silicon compound in the reaction zone during the reacting of the feedstock.

3. The method according to claim 1, wherein the carbon content is produced by the carbon-containing silicon compound having a residence time in the reaction zone that is is shorter than needed for a complete reaction of the feedstock.

4. The method according to claim 3, wherein the residence time is provided by the reaction zone being excessively short or by producing an excessively high flow velocity of the feedstock in the reaction zone.

5. The method according to claim 1, wherein the soot body has a mean relative density in a range between 20% and 35% of a density of quartz glass of 2.21 $g/cm^3$.

6. The method according to claim 1, wherein the synthetic quartz glass has a hydroxyl group content of less than 1 wt. ppm.

7. The method according to claim 1, wherein the drying is carried out such that the synthetic quartz glass after vitrification has a chlorine content in a range of 800-2500 wt. ppm.

8. The method according to claim 1, wherein the soot body has a carbon content in a range of 2 wt. ppm to 25 wt. ppm.

9. The method according to claim 1, wherein the feedstock comprises octamethylcyclotetrasiloxane.

* * * * *